United States Patent [19]

Schulz et al.

[11] Patent Number: 4,882,405

[45] Date of Patent: *Nov. 21, 1989

[54] TERPOLYMERS OF ACRYLAMIDE, ALKYLACRYLAMIDE AND BETAINE MONOMERS

[75] Inventors: Donald N. Schulz, Annandale; Ilan Duvdevani, Leonia; Jan Bock, Bridgewater; Enock Berluche, Lopatcong Township, Warren County, all of N.J.

[73] Assignee: Exxon Research and Engineering Company, Florham Park, N.J.

[*] Notice: The portion of the term of this patent subsequent to Mar. 17, 2004 has been disclaimed.

[21] Appl. No.: 259,935

[22] Filed: Oct. 19, 1988

Related U.S. Application Data

[63] Continuation of Ser. No. 123,394, Nov. 26, 1987, abandoned, which is a continuation-in-part of Ser. No. 937,688, Dec. 4, 1986, Pat. No. 4,742,135, which is a continuation of Ser. No. 814,252, Dec. 30, 1985, Pat. No. 4,650,848.

[51] Int. Cl.$^4$ .............................................. C08F 26/06
[52] U.S. Cl. .................................. 526/265; 526/287; 526/307.2
[58] Field of Search ...................... 526/265, 287, 307.2

[56] References Cited

U.S. PATENT DOCUMENTS

| | | | |
|---|---|---|---|
| 4,650,848 | 3/1987 | Schulz | 526/307.2 |
| 4,742,135 | 5/1988 | Schulz | 526/307.2 |

Primary Examiner—Joseph L. Schofer
Assistant Examiner—Alex H. Walker
Attorney, Agent, or Firm—Richard E. Nanfeldt

[57] ABSTRACT

A water or brine soluble terpolymer having the structure:

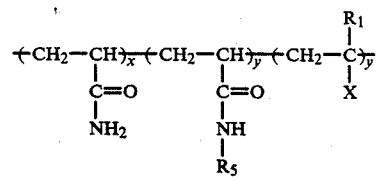

wherein X is selected from the group consisting of

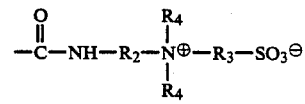

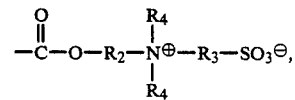

and

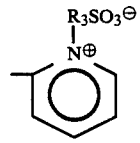

wherein x is about 1 to about 95 mole percent; y is about 0.1 to about 5.0 mole percent; $R_1$ is methyl or hydrogen; z is 1 to 29 mole percent; $R_2$ is an alkyl group of 1-5 carbon atoms; $R_3$ is an alkyl group of 3 to 4 carbon atoms; $R_4$ is an alkyl group of 1-5 carbon atoms; and $R_5$ is an alkyl group of 4-20.

2 Claims, No Drawings

TERPOLYMERS OF ACRYLAMIDE, ALKYLACRYLAMIDE AND BETAINE MONOMERS

This is a continuation of application Ser. No. 123,394, filed 11/20/87, which is a continuation-in-part application of U.S. Ser. No. 937,688 filed Dec. 4, 1986 now U.S. Pat. No. 4,742,135, which is a Rule 60 continuation of U.S. Ser. No. 814,252 filed Dec. 30, 1985 now U.S. Pat. No. 4,650,848 which was based on P.M. 85-CL-063.

BACKGROUND OF THE INVENTION

Poly(sodium acrylamidomethyl propane sulfonate), polyacrylamide and partially hydrolyzed polyacrylamide, and copolymers thereof are water soluble polymers that have been previously disclosed in the literature and have found application in the viscosification of aqueous solutions. These polymers viscosify through a combination of high molecular weight and chain expansion due to repulsion of pendant ionic groups along the polymers chain or H-bonding. These polymers are salt-sensitive, thereby limiting their application in highly saline systems.

The betaines are a special class of zwitterions. These materials are self neutralized and contain no counterions. Moreover, the positive and negative charges are separated by alkyl groups.

Carboxymethacrylate betaine monomers (I) and polymers (II) are well-known and disclosed in U.S. Pat. No. 2,777,872 (Jan. 15, 1957), U.S. Pat. No. 2,834,658 (May 13, 1958) and U.S. Pat. No. 2,846,417 (Aug. 5, 1958).

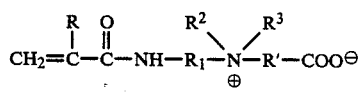

(I)

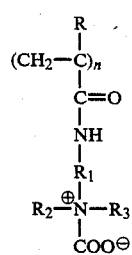

(II)

Carboxyvinylpyridine betaine monomers and homopolymers (III) have also been reported [H. Ladenheim and H. Morawetz, J. Poly. Sci. 26, 251 (1957)].

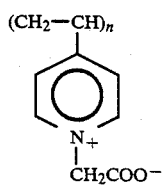

(III)

Sulfovinylpyridine betaine monomers and homopolymers (IV) are known [R. Hart and D. Timmerman, J. Poly. Sci. 28, 118 (1958)] and Ger. Auslegeschrift 1,207,630 and Galin, et al., Polymer, 25, 121, 254 (1984).

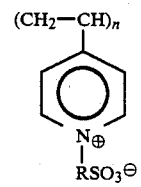

(IVA)

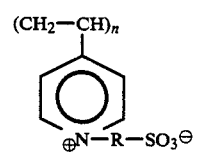

(IVB)

The butylsulfobetaine of poly(2-vinylpyridine) (IVB) is soluble in water, but the butylsulfobetaine of poly(4-vinylpyridine) (IVA) is not. Both betaines are soluble in salt solution.

Methacrylate based sulfobetaine monomers and homopolymers (V) are described by Galin Polymer, 25, 121,254 (1984) and Ger. Auslegeschrift 1,207,630, U.S. Pat. No. 3,549,605 and U.S. Pat. No. 3,493,547.

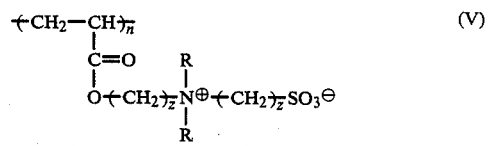

(V)

Copolymers of acrylamide and methacrylate and vinyl pyridine betaine monomers, like IV and V, are described in Ger. Auslegeschrift 1,207,630.

In turn, copolymers of long chain alkyl acrylamide and acrylamide have been described by Bock, et al. (U.S. Pat. No. 4,520,182). Enhanced viscosification is claimed for the latter materials. Such materials are prepared by special micellar (U.S. Pat. No. 4,528,348) or microemulsion (U.S. Pat. No. 4,521,580) polymerization methods using surfactants like sodium lauryl sulfate (SDS) to incorporate the long chain alkylacrylamide.

SUMMARY OF THE INVENTION

The present invention relates to unique and novel water or brine soluble betaine terpolymers which are terpolymers of acrylamide, long chain N-alkylacrylamide and ester-, amide- or vinyl pyridine-based betaine monomers. Such polymers contain both zwitterion and hydrophobic groups and are represented by the following structures:

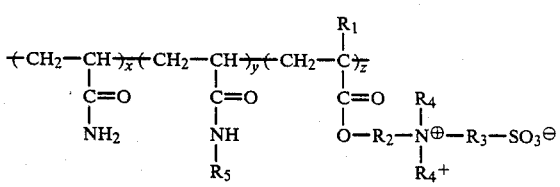

(ester based)

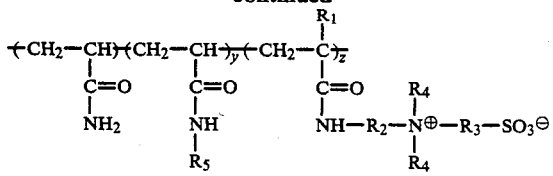

(amide based)

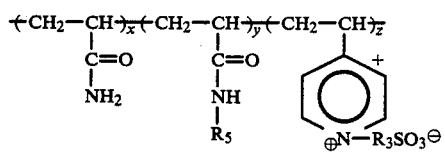

(vinyl pyridine based)

wherein x is about 70 to about 95 mole percent, more preferably about 80 to about 90 percent; y is about 0.1 to about 5.0 mole percent, more preferably about 0.2 to about 3.0; and z is 1 to 29 mole percent, and more preferably about 5 to about 20 mole percent. $R_1$ is methyl or hydrogen; $R_2$ is an alkyl group of 1–5 carbons; $R_3$ is an alkyl group of 3–4 carbons; $R_4$ is an alkyl group of 1–5 carbon atoms; and $R_5$ is an alkyl group having about 4–30 carbon atoms, more preferably 5 to about 20 carbon atoms.

Thus, the instant structures are different from conventional polyelectrolyte homo- or copolymers, which contain either positive or negative charges. In addition, unlike conventional polyelectrolytes, the aqueous viscosities of the instant materials increase with increasing concentration of salts, like sodium chloride.

The present invention is distinguished from the carboxymethacrylate betaine homopolymers and copolymers (U.S. Pat. Nos. 2,777,872, 2,834,758, 2,846,417) due to the presence of sulfonates rather than carboxylate anions and low in contrast to high charge densities are used. Furthermore, carboxylate anions are limited by their known susceptibility to precipitation by polyvalent cations (e.g. $Ca^{++}$); the latter species are often found in geological formations [F. J. Glaris in "Water Soluble Resins" 2nd Ed, R. L. Davidson and M. Sittig, Eds. Rheinhold, NY, p. 168]. Sulfonate anions are not so limited.

The instant invention is different from other sulfobetaine polymers of the art by virtue of the presence of the hydrophobic group (N-alkylacrylamide), by the mode of preparation (i.e., micellar or microemulsion polymerization with sodium lauryl sulfate, SDS) and by the surprisingly high enhancement in viscosities with increasing salt contents.

The instant terpolymers are distinguished from the copolymers of acrylamide and long chain N-alkyl acrylamides by their chemical structures and their unexpected high retention of viscosity in high concentrations of brine (e.g., NaCl).

GENERAL DESCRIPTION OF THE INVENTION

The present invention relates to a method for increasing the viscosity of a water or a salt solution which comprises the step of dissolving about 0.1 to about 5.0 wt.% of a water or brine-soluble terpolymer of acrylamide/N-alkylacrylamide/betaine in an aqueous solution, wherein the aqueous solution is selected from the group consisting of water or a brine solution and the concentration of the brine in the aqueous solution is about 0.01 to about 20.0 wt. %.

The viscosifying agents for aqueous and saline (brine) solutions of the present invention are water or brine soluble betaine terpolymers formed by a homogeneous, free radical, terpolymerization, wherein the water soluble terpolymers are characterized by the formulae:

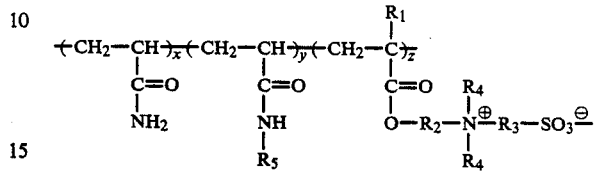

(ester based)

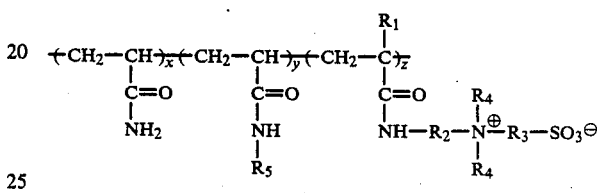

(amide based)

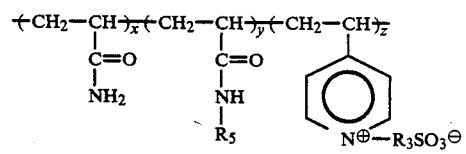

(vinyl pyridine based)

wherein x is about 70 to about 95 mole percent, more preferably about 80 to about 90 mole percent; y is about 0.1 to about 5.0 mole percent, more preferably about 0.2 to about 3.0; and z is 1 to 29 mole percent, and more preferably about 5 to about 20 mole percent. $R_1$ is methyl or hydrogen; $R_2$ is an alkyl group of 1–5 carbons; $R_3$ is an alkyl group of 3–4 carbons, $R_4$ is an alkyl group of 1–5 carbon atoms; and $R_5$ is an alkyl group having about 4–30 carbon atoms, more preferably about 5 to about 20 carbon atoms.

The viscosities of aqueous or brine solutions of these betaine terpolymers were measured by means of a Contraves ™ low shear viscometer model LS30 using a No. 1 cup and No. 1 bob. Temperatures were controlled to +1° C., and measurements were made at a rotational speed that gave a shear rate of 1.28 $s^{-1}$.

The homogeneous terpolymerization process of the instant invention comprises the steps of forming a mixture of acrylamide monomer, long chain N-alkylacrylamide monomer and betaine monomer in the presence of SDS surfactant under a nitrogen atmosphere; adding deoxygenated water to said mixture to form a reaction solution; adding a free radical initiator to said reaction solution to initiate the copolymerization of the acrylamide monomer, long chain N-alkylacrylamide monomer and the betaine monomer; polymerizing the monomers at a sufficient temperature and for a sufficient time to form the water soluble terpolymer of acrylamide monomer, N-alkylacrylamide monomer and betaine monomer; and recovering the water soluble terpolymer from the reaction solution. The SDS is present in the polymerization to facilitate incorporation of the alkylacrylamide, as in U.S. Pat. No. 4,521,580 and U.S. Pat. No. 4,528,348.

Suitable free radical initiators for the instant free radical-copolymerization process are potassium persulfate; sodium thiosulfate, potassium persulfate mixture; benzoyl peroxide, AIBN and other common free radical initiators. The concentration of the free radical initiator is about 0.02 to about 0.50 grams per 100 grams of total monomer.

Polymerization of the acrylamide monomer, N-alkyl acrylamide monomer and N-3(3-sulfopropyl)N-methacryol-oxyethyl-N,N-dimethyl-ammoniumbetaine (SPE) monomer is effective at a temperature of about 25° to about 90° C., more preferably at about 30° to about 65° C., and most preferably at about 45° to about 55° C. for a period of about 1 to about 48 hours, more preferably at about 2 to about 36, and most preferably at about 4 to about 24. A suitable method for recovery of the formed terpolymer from the reaction solution comprises precipitation by means of acetone.

DESCRIPTION OF THE PREFERRED EMBODIMENTS

The following examples illustrate the present invention without, however, limiting the same hereto.

EXAMPLE 1

(9722-124)

Terpolymer of Acrylamide, Alkylacrylamide, and N-(3-Sulfopropyl)N-Methacroyloxethyl N,N-dimethyl Ammonium Betaine (SPE), RAM/SPE, AM/C$_8$AM/SPE=94/1/5 Mole %

A 1,000 ml resin flask was fitted with a condenser, electric stirrer, thermometer, N$_2$ inlet and outlet. The flask was purged with N$_2$ for 1 hour while water was boiled and cooled under N$_2$. To the flask was charged 470 grams of H$_2$O, 12.13 grams recrystallized acrylamide, 0.33 grams n-octylacrylamide, 15.85 grams SDS (sodium dodecyl sulfate) and 2.45 grams of SPE betaine monomer. The solution was heated to 50° C. and the K$_2$S$_2$O$_8$ (0.01 grams) initiator was added. Polymerization was evident after one hour. The run was continued for 24 hours at 50° C. The sample was precipitated into acetone.

EXAMPLE 2

(9722-125)

Copolymer of Acrylamide and Alkylacrylamide, RAM

A 1,000 ml resin flask was fitted with a condenser, electric stirrer, thermometer, N$_2$ inlet and outlet. The flask was purged with N$_2$ for one hour, while water was boiled and cooled under N$_2$. To the flask was charged 470 grams of H$_2$O, 14,62 grams recrystallized acrylamide, 0.38 grams of n-octylacrylamide, 15.85 grams of SDS. The solution was heated to 50° C. and 0.01 grams of K$_2$S$_2$O$_8$ initiator was added. The polymer was precipitated in acetone and vacuum dried.

EXAMPLE 3

(9595-147)

Copolymer of Acrylamide and SPE, AM/SPE

A two liter reaction kettle was equipped with an air driven stirrer, water condenser, thermometer and subsurface nitrogen purge. One liter of distilled deionized water was added and heated at 50°-55° C. for one hour while stirring and rapid nitrogen sweep. The nitrogen inlet was raised and the monomers, acrylamide (30 grams), and N-(3-sulfopropyl)-N-methacryoloxyethyl-N,N-dimethylammonium betaine (SPE) (6.1 grams) were added. A 0.023 gram quantity of K$_2$S$_2$O$_8$ initiator was charged and the polymerization continued at 52°-54° C. for 19 hours. Polymer was isolated by acetone precipitation and vacuum drying.

EXAMPLE 4

(9595-153)

Copolymer of Acrylamide and Sodium Styrene Sulfonated, AM/SSNa 95/5 Mole %

A control polyelectrolyte was prepared according to the method of Example 3, except that sodium styrene sulfonate was substituted for SPE. Thus, 30 grams of acrylamide, 4.53 grams of poly (sodium styrene sulfonate) were charged to the reactor with one liter of distilled, deionized water. A 0.023 gram quantity of K$_2$S$_2$O$_8$ initiator was charged and the polymerization continued for 51°-52° C. for 17 hours. The batch was diluted with additional water, precipitated with acetone and vacuum dried.

EXAMPLE 5

Viscosities of Polymer Solutions With and Without Salt

Viscosities of polymer solutions with and without NaCl were measured on a Brookfield viscometer. The viscosity ratio (i.e., the viscosity of the polymer solution in salt divided by the viscosity of the polymer solution in water) was used to indicate the effectiveness of polymers in maintaining their viscosities in the presence of NaCl. Table 1 shows that AM/SSNa, a classical polyelectrolyte, shows a viscosity ratio less than 1. In contrast. AM/SPE, RAM and RAM/SPE show viscosity ratios greater than 1. Furthermore, RAM/SPE shows a surprising synergistic increase in viscosity ratio as one increases the salt concentration from 2-20%.

TABLE 1

| Polymer Type | Polymer Concentration Wt. % | % NaCL | Viscosity Ratio of Salt/NH$_2$O |
|---|---|---|---|
| RAM/SPE | 0.5 | 0 | — |
|  |  | 2 | 6.5 |
|  |  | 5 | 11.0 |
|  |  | 10 | 170.0 |
|  |  | 20 | 445.0 |
| RAM | 0.5 | 0 | — |
|  |  | 2 | 15.7 |
|  |  | 5 | 24.0 |
|  |  | 10 | 29.6 |
|  |  | 20 | 22.6 |
| AM/SPE | 1.8 | 0 | — |
|  |  | 2 | 1.2 |
|  |  | 5 | — |
|  |  | 10 | 1.6 |
|  |  | 20 | 1.5 |
| AM/SSNa | 1.7 | 0 | — |
|  |  | 2 | 0.4 |
|  |  | 5 | 0.3 |
|  |  | 10 | 0.3 |
|  |  | 20 | 0.3 |

What is claimed is:

1. A brine and water soluble terpolymer having the structure:

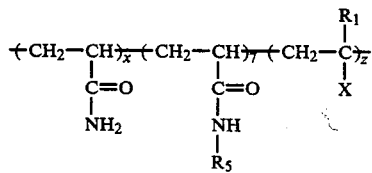

wherein X is selected from the group consisting of

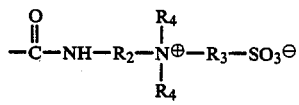

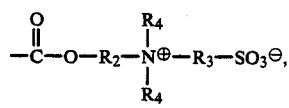

and

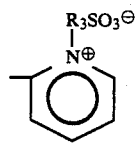

wherein x is about 70 to about 95 mole percent; y is about 0.1 to about 5 mole percent, $R_1$ is methyl or hydrogen; z is about 1.0 to about 29.0 mole percent; $R_2$ is an alkyl group of 1–5 carbon atoms; $R_3$ is an alkyl group of 3 to 4 carbon atoms; $R_4$ is an alkyl group of 1–5 carbon atoms; and $R_5$ is an alkyl group of 4–20 carbon atoms.

2. A method for increasing the viscosity of a water or a brine solution which comprises the step of dissolving in said solution a water soluble terpolymer having the structure:

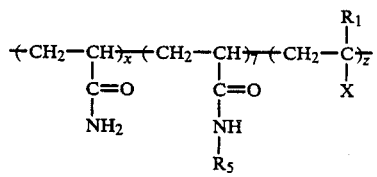

wherein X is selected from the group consisting of

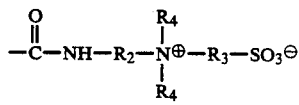

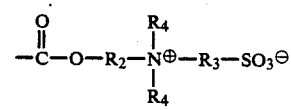

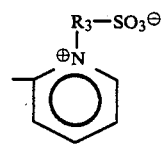

wherein X is about 70 to about 95 mole percent; y is about 0.1 to about 5.0 mole percent; $R_1$ is methyl or hydrogen; z is about 1.0 to about 29.0 mole percent; $R_2$ is an alkyl group of 1–5 carbon atoms; $R_3$ is an alkyl group of 3 to 4 carbon atoms; $R_4$ is an alkyl group of 1–5 carbon atoms; and $R_5$ is an alkyl group of 4–20 carbon atoms.

* * * * *